US010608561B2

(12) United States Patent
Sumita et al.

(10) Patent No.: US 10,608,561 B2
(45) Date of Patent: Mar. 31, 2020

(54) CONTROL DEVICE OF AC MOTOR

(71) Applicant: Hitachi, Ltd., Chiyoda-ku, Tokyo (JP)

(72) Inventors: Satoshi Sumita, Tokyo (JP); Yoshitaka Iwaji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/741,787

(22) PCT Filed: Jul. 10, 2015

(86) PCT No.: PCT/JP2015/069818
§ 371 (c)(1),
(2) Date: Jan. 4, 2018

(87) PCT Pub. No.: WO2017/009883
PCT Pub. Date: Jan. 19, 2017

(65) Prior Publication Data
US 2018/0198386 A1 Jul. 12, 2018

(51) Int. Cl.
*H02H 7/122* (2006.01)
*H02P 1/42* (2006.01)
(Continued)

(52) U.S. Cl.
CPC ............ *H02P 6/16* (2013.01); *H02M 1/12* (2013.01); *H02M 7/53871* (2013.01); *H02P 27/06* (2013.01); *H02M 2007/53876* (2013.01)

(58) Field of Classification Search
CPC ......... H02H 7/1227; H02P 1/426; H02P 6/16; G01P 3/48; B60K 6/26
See application file for complete search history.

(56) References Cited

U.S. PATENT DOCUMENTS

| 5,646,499 A * | 7/1997 | Doyama | .................. | H02P 23/08 |
| | | | | 318/801 |
| 2006/0125439 A1* | 6/2006 | Ajima | ....................... | B60K 6/26 |
| | | | | 318/716 |

(Continued)

FOREIGN PATENT DOCUMENTS

JP 2010-154735 A 7/2010
JP 2013-5604 A 1/2013
(Continued)

OTHER PUBLICATIONS

International Search Report (PCT/ISA/210) issued in PCT Application No. PCT/JP2015/069818 dated Sep. 15, 2015 with English translation (5 pages).
(Continued)

*Primary Examiner* — Cortez M Cook
(74) *Attorney, Agent, or Firm* — Crowell & Moring LLP

(57) ABSTRACT

Provided is a control device of an AC motor, including: an inverter including a switching element; switching control means for controlling the switching element; and phase detection means for detecting a rotor phase of an AC motor, wherein the switching control means controls the switching element so that a voltage waveform of the inverter has half-wave symmetry in an interval of a width centering on a fundamental voltage phase of 180 deg±180 deg, the switching control means controls the switching element so that a harmonic voltage phase of the inverter becomes variable on the basis of a fundamental voltage-rotor phase difference which is a difference between a fundamental voltage phase and the rotor phase of the AC motor, and the switching control means controls the switching element so that a harmonic voltage amplitude of each order of the inverter is inversely proportional to the order.

7 Claims, 6 Drawing Sheets

(51) Int. Cl.
*G01P 3/48* (2006.01)
*B60K 6/26* (2007.10)
*H02P 6/16* (2016.01)
*H02P 27/06* (2006.01)
*H02M 1/12* (2006.01)
*H02M 7/5387* (2007.01)

(56) References Cited

U.S. PATENT DOCUMENTS

| | | | |
|---|---|---|---|
| 2008/0129238 A1* | 6/2008 | Andersen | H02H 7/1227 318/565 |
| 2010/0052599 A1* | 3/2010 | Nagai | H02P 1/426 318/766 |
| 2010/0134053 A1 | 6/2010 | Yamada et al. | |
| 2013/0200830 A1 | 8/2013 | Suzuki et al. | |

FOREIGN PATENT DOCUMENTS

| | | |
|---|---|---|
| JP | 2013-162660 A | 8/2013 |
| WO | WO 2011/135623 A1 | 11/2011 |
| WO | WO 2014/024402 A1 | 2/2014 |

OTHER PUBLICATIONS

Japanese-language Written Opinion (PCT/ISA/237) issued in PCT Application No. PCT/JP2015/069818 dated Sep. 15, 2015 (4 pages).

* cited by examiner

[Fig. 1]
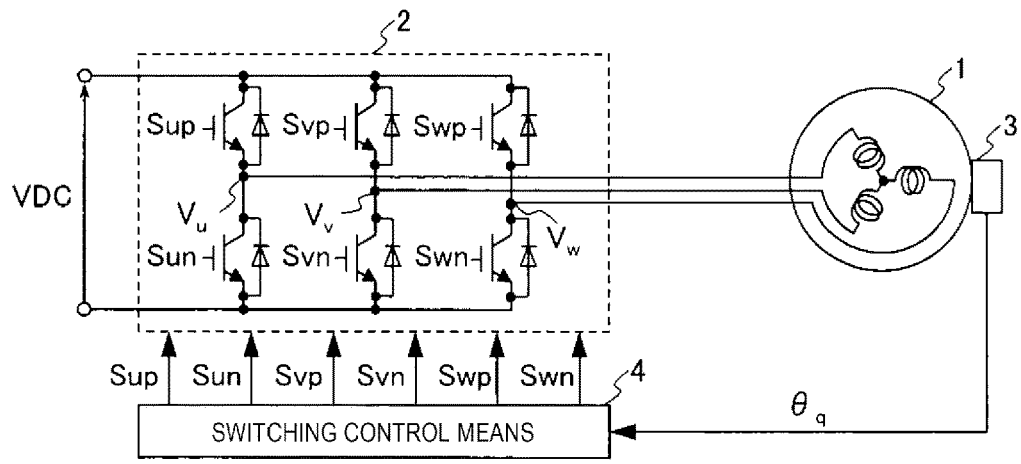
[Fig. 2]
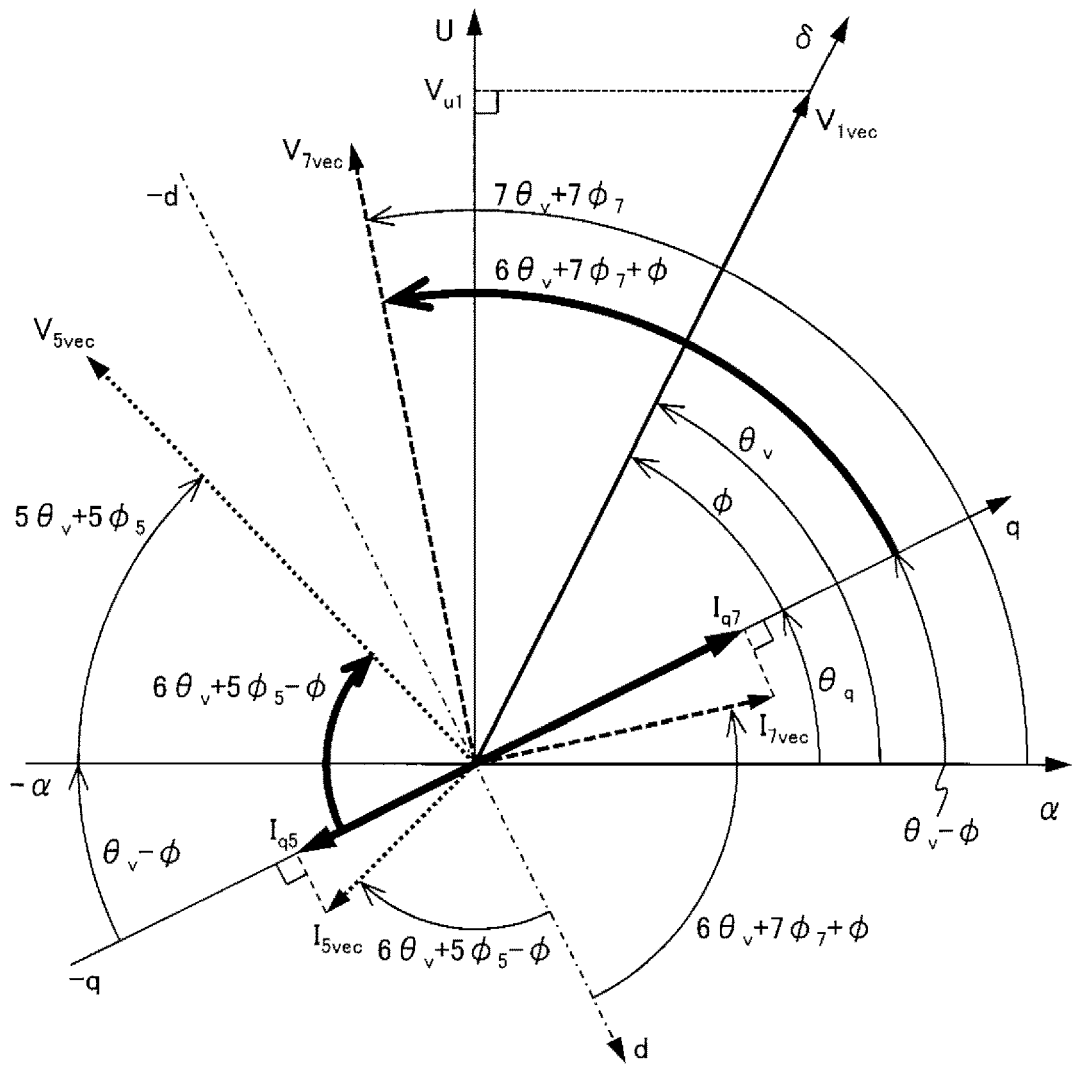

[Fig. 3]
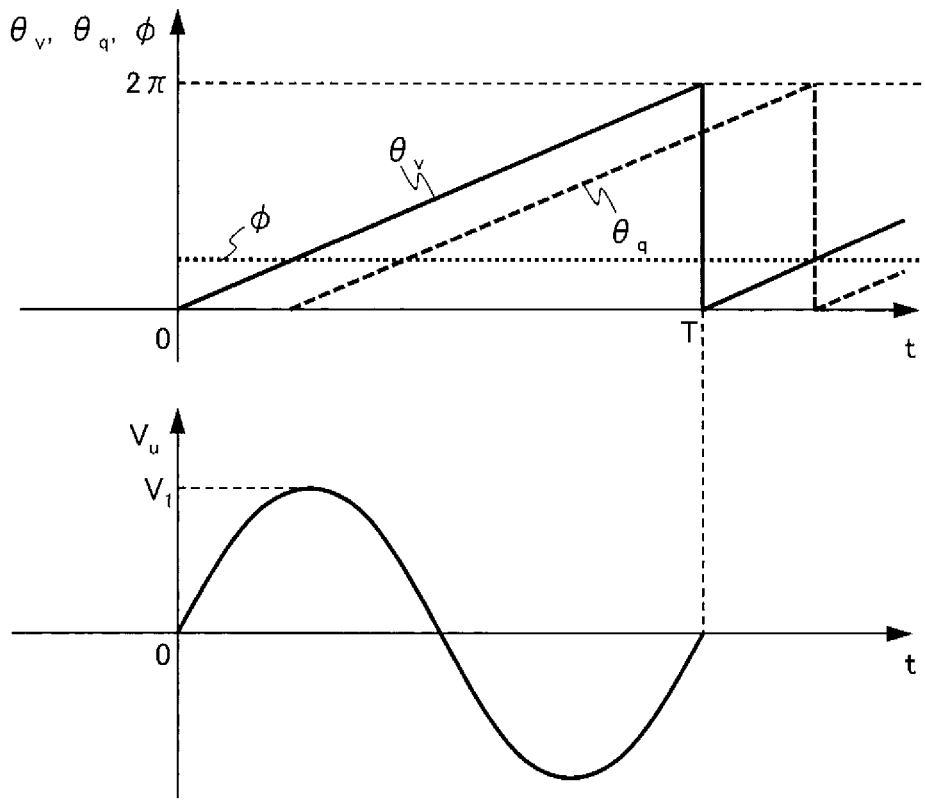
[Fig. 4]
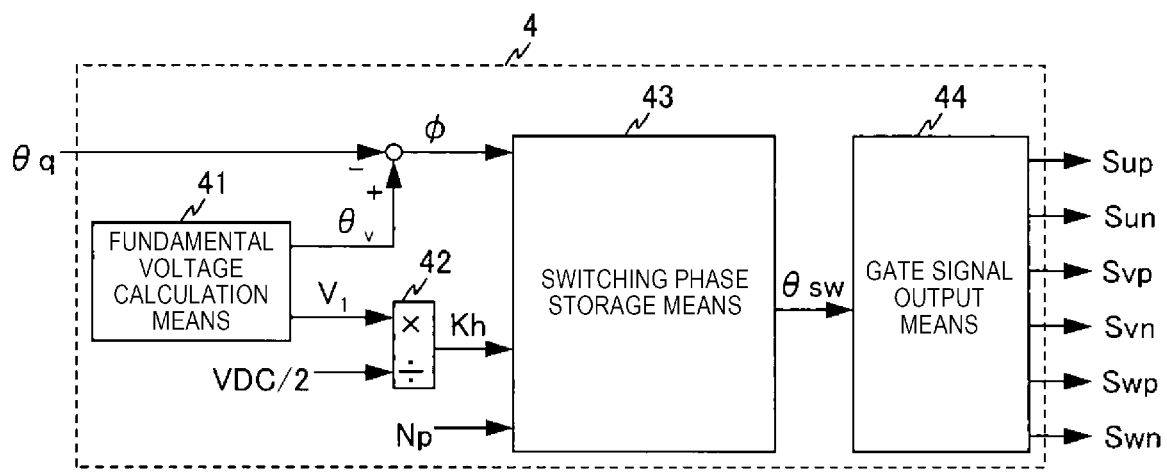

[Fig. 5]
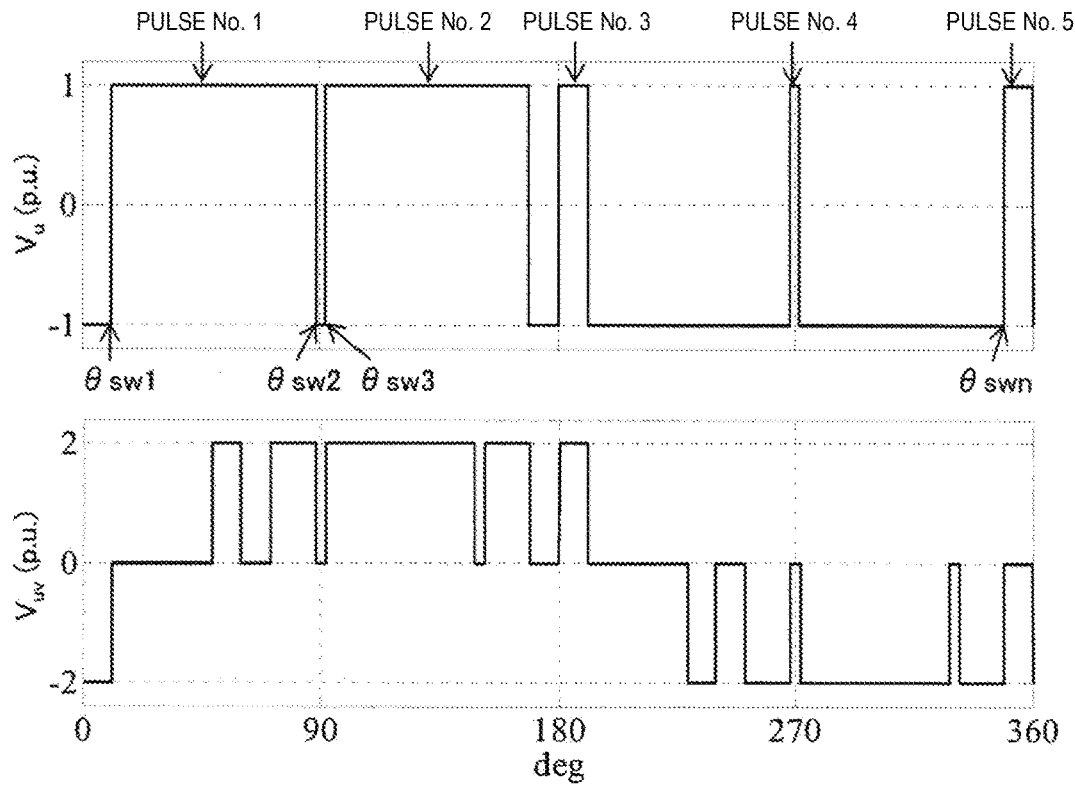
[Fig. 6]
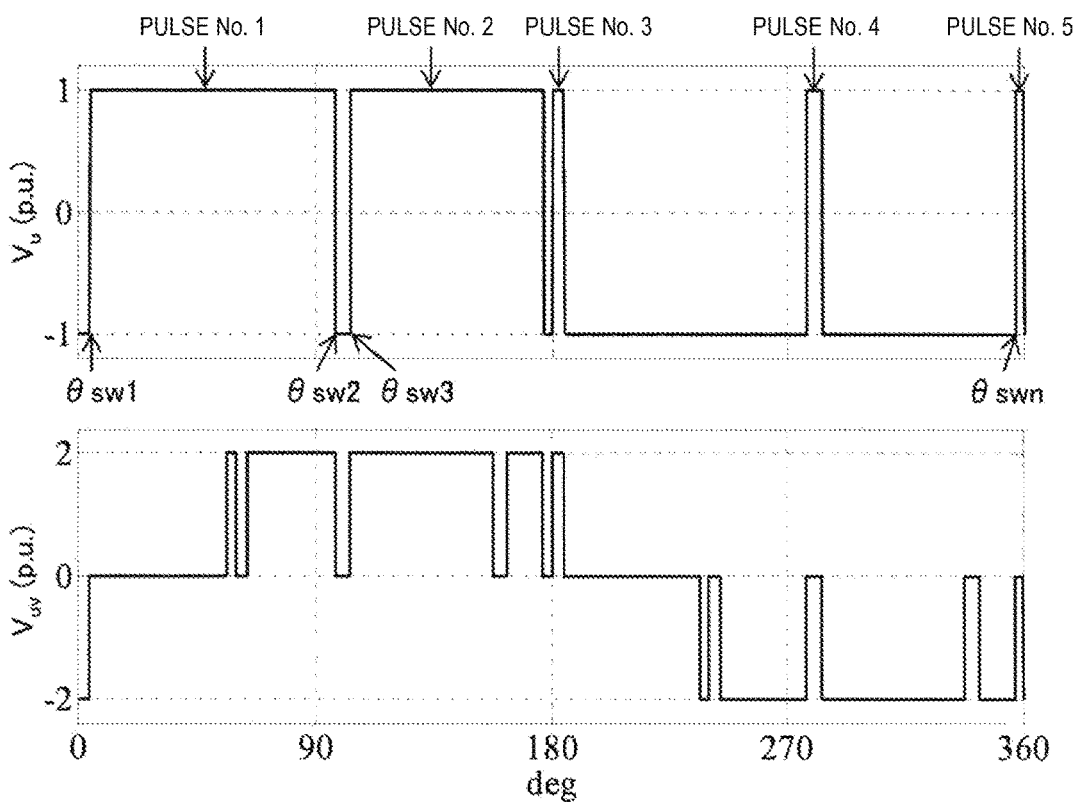

[Fig. 7]
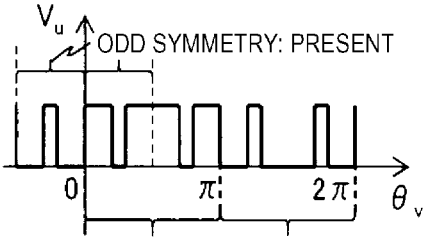

[Fig. 8]
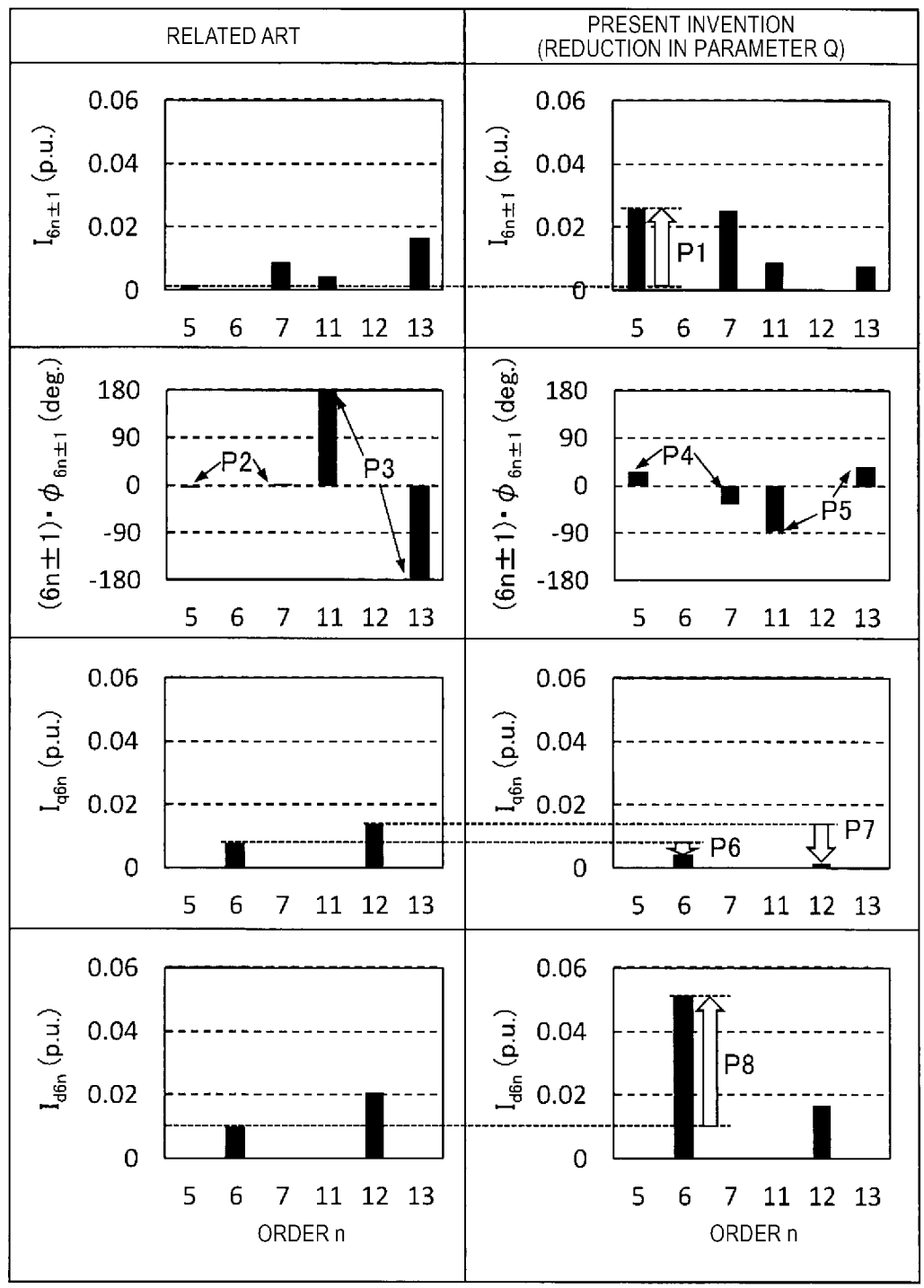

[Fig. 9]
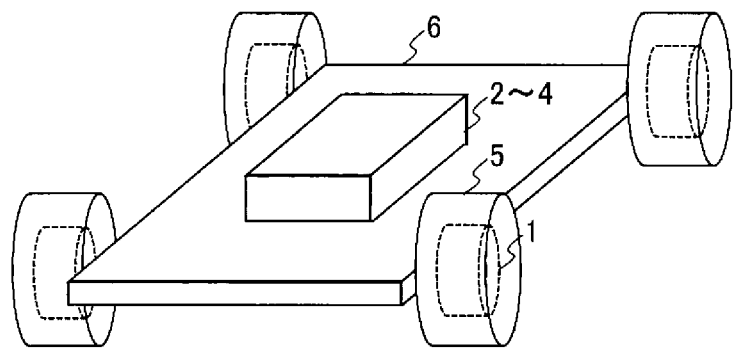
[Fig. 10]
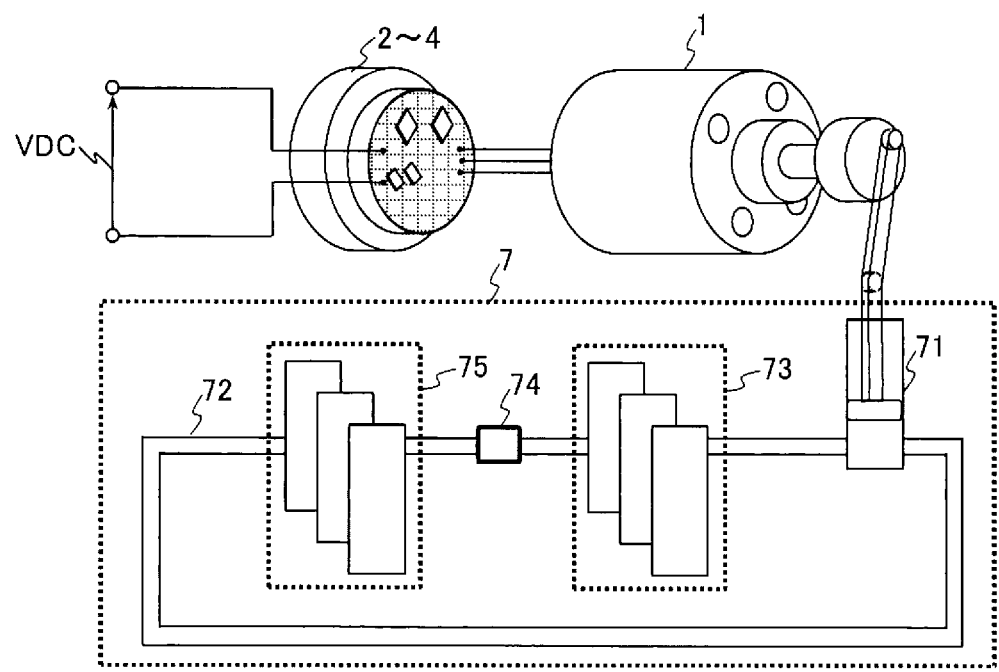

CONTROL DEVICE OF AC MOTOR

TECHNICAL FIELD

The present invention relates to a control device of an AC motor, and particularly relates to a control technique for reducing the torque pulsation of an AC motor.

BACKGROUND ART

The torque pulsation of an AC motor is preferably small from the viewpoint of vibration and noise. However, an inverter that supplies power to the AC motor realizes variable speed control, and thus is accompanied by a switching operation performed by a switching element (semiconductor element) (PWM control). Thereby, in a case where a harmonic voltage is generated and is applied to the AC motor, a harmonic current flows, which results in causing torque pulsation and vibration and noise.

In PTL 1, in switching control, the width of its OFF interval decreases monotonically from a fundamental voltage phase of 0 deg toward 90 deg, and is further optimized so that a harmonic current is minimized. Here, the fundamental voltage phase of 0 deg is a phase when the fundamental voltage (sine wave) of an inverter changes from negative to positive. In PTL 2, switching control is performed so as to lose half-wave symmetry in the interval of a width centering on a fundamental voltage phase of 180 deg±180 deg, and a harmonic current is reduced.

CITATION LIST

Patent Literatures

PTL 1: JP-A-2010-154735
PTL 2: WO14/024402

SUMMARY OF INVENTION

Technical Problem

In PTL 1, the voltage waveform of an inverter has symmetry, and both a fundamental voltage phase and a harmonic voltage phase are fixed to zero. For this reason, a harmonic current can be minimized, but its phase is not able to be offset-adjusted, and be avoided from a torque axis. That is, a component contributing to a torque pulsation within the harmonic current is not reduced intensively with respect to the orthogonal component.

In PTL 2, since there is no half-wave symmetry, a harmonic current phase is able to be offset-adjusted. However, in a case where the half-wave symmetry is lost, it is known that even-ordered harmonic voltages and harmonic currents are generated, and a torque pulsation due to this is generated.

An object of the present invention is to make it possible to suppress the generation of even-ordered harmonic voltages and currents, and to intensively reduce a harmonic current component contributing to a torque pulsation rather than the orthogonal component.

Solution to Problem

The feature of the present invention to solve the above object is, for example, as follows.

There is provided a control device of an AC motor, including: an inverter including a switching element; switching control means for controlling the switching element; and phase detection means for detecting a rotor phase of an AC motor, wherein the switching control means controls the switching element so that a voltage waveform of the inverter has half-wave symmetry in an interval of a width centering on a fundamental voltage phase of 180 deg±180 deg, the switching control means controls the switching element so that a harmonic voltage phase of the inverter becomes variable on the basis of a fundamental voltage-rotor phase difference which is a difference between a fundamental voltage phase and the rotor phase of the AC motor, and the switching control means controls the switching element so that a harmonic voltage amplitude of each order of the inverter is inversely proportional to the order.

Advantageous Effects of Invention

In the present invention, it is possible to suppress the generation of even-ordered harmonic voltages and currents, and to intensively reduce a harmonic current component contributing to a torque pulsation rather than the orthogonal component. In addition, the effect is held regardless of the operation conditions of an AC motor. Objects, configurations and effects other than those described above will become more apparent from the description of the following embodiment.

BRIEF DESCRIPTION OF DRAWINGS

FIG. 1 is a configuration diagram of a control device of an AC motor in Example 1.
FIG. 2 is a vector diagram of voltages and currents.
FIG. 3 is a waveform diagram of a rotation phase and a U-phase voltage.
FIG. 4 is a configuration diagram of switching control means.
FIG. 5 is a voltage waveform diagram of an inverter according to the related art.
FIG. 6 is a voltage waveform diagram of an inverter according to the present invention.
FIG. 7 is results of comparison between the related art and the present invention.
FIG. 8 is results of comparison between the related art and the present invention in which a reduction in parameter Q is used.
FIG. 9 is a configuration diagram of an electromotive vehicle drive system provided with the control device of an AC motor according to the present invention.
FIG. 10 is a configuration diagram of a compressor provided with the control device of an AC motor according to the present invention.

DESCRIPTION OF EMBODIMENTS

Hereinafter, an embodiment of the present invention will be described with reference with the accompanying drawings or the like. In the following description, specific examples of the contents of the present invention are illustrated, the present invention is not limited to the description thereof, and can be variously changed and modified by those skilled in the art within the scope of the technical idea disclosed in the present specification. In addition, in all the drawings for the purpose of describing the present invention, components having the same functions are denoted by the same reference numerals and signs, and thus the description thereof may not be repeated.

EXAMPLE 1

Example 1 will be described with reference to FIGS. 1 to 8. FIG. 1 is a configuration diagram of a control device of an AC motor in Example 1.

An AC motor 1 is configured such that a three-phase alternating current (U-phase current $I_u$, V-phase current $I_v$, and W-phase current $I_w$) flows by a three-phase alternating-current voltage (U-phase voltage $V_u$, V-phase voltage $V_v$, and W-phase voltage $V_w$) being applied by an inverter 2, and that a motor torque is generated. In the present invention, the U-phase voltage $V_u$ is a voltage in itself which is output the U-phase of the inverter 2, and is distinguished from a fundamental component and a harmonic component included therein. The same is true of the V-phase and the W-phase.

The state quantity of the AC motor 1 will be described. FIG. 2 is a vector diagram of voltages and currents. A U-axis indicates the direction of magnetic flux which is generated by the U-phase coil of the AC motor 1. An α-axis is an axis lagged by 90 deg rather than the U-axis (counterclockwise direction: advance, and clockwise direction: lag). A q-axis is an axis advanced by a rotor phase $θ_q$ rather than the α-axis, and indicates the torque axis of the AC motor 1. That is, a current component parallel to this axis contributes to a motor torque. A d-axis is an axis lagged by 90 deg rather than the q-axis. A δ-axis is an axis indicating the vector direction of a fundamental voltage $V_{1vec}$ of the inverter 2. The U-axis component of the fundamental voltage $V_{1vec}$ is a U-phase fundamental voltage $V_{u1}$. A phase difference the δ-axis and the α-axis is set to a fundamental voltage phase $θ_v$, and a phase difference the δ-axis and the q-axis is set to a fundamental voltage-rotor phase difference φ ($φ=θ_v−θ_q$).

An example of the operation of the AC motor 1 will be described. FIG. 3 is a waveform diagram of a rotation phase and a U-phase voltage. At time t=0, the output voltage fundamental phase $θ_v$ is zero, increases with the elapse of time, and returns to zero in a period T. In this case, a U-phase fundamental voltage $V_{u1}$, a V-phase fundamental voltage $V_{v1}$, and a W-phase fundamental voltage $V_{w1}$ are represented by (Expression 1).

$$\begin{bmatrix} V_{u1} \\ V_{v1} \\ V_{w1} \end{bmatrix} = V_1 \begin{bmatrix} \sin θ_v \\ \sin\left(θ_v - \frac{2π}{3}\right) \\ \sin\left(θ_v + \frac{2π}{3}\right) \end{bmatrix}$$ (Expression 1)

Here, $V_1$ is a fundamental voltage amplitude.

The rotor phase $θ_q$ follows the fundamental voltage phase $θ_v$ in a state of being lagged by the fundamental voltage-rotor phase difference φ. The fundamental voltage-rotor phase difference φ is a value which is determined by the characteristics, operation conditions and the like of the AC motor 1, and the fundamental voltage-rotor phase difference φ is a constant value in a case of a steady operation. An increase in the rotor phase $θ_q$ means the rotation of the AC motor 1, and the time derivative of the rotor phase $θ_q$ is the rotational speed ω of the AC motor 1. The above is the description of the AC motor 1.

The inverter 2 of FIG. 1 includes a switching element, converts a direct-current voltage VDC into three-phase alternating-current voltages $V_u$, $V_v$, and $V_w$ through switching, and applies the converted voltages to the AC motor 1.

Phase detection means 3 detects the rotor phase $θ_q$ of the AC motor 1, and outputs the detected rotor phase to switching control means 4 described later.

The switching control means 4 outputs gate signals Sup, Sun, Svp, Svn, Swp, and Swn on the basis of the rotor phase $θ_q$. Each of the gate signals turns ON•OFF the switching element of the inverter 2. That is, the switching control means 4 controls the switching element.

The details of the switching control means 4 will be described. FIG. 4 is a configuration diagram of the switching control means 4. The switching control means 4 includes fundamental voltage calculation means 41, division means 42, switching phase storage means 43, and gate signal output means 44.

The fundamental voltage calculation means 41 calculates the fundamental voltage amplitude $V_1$ and the fundamental voltage phase $θ_v$ on the basis of vector control, V/f control or the like.

The division means 42 divides the fundamental voltage amplitude $V_1$ by half the value VDC/2 of the direct-current voltage, and outputs a modulation factor Kh.

The switching phase storage means 43 outputs a switching phase $θ_{sw}$ on the basis of the fundamental voltage-rotor phase difference φ, the modulation factor Kh and a pulse number Np. The pulse number Np is the number of pulses per period of the U-phase voltage $V_u$.

FIG. 5 shows a voltage waveform diagram of an inverter according to the related art. Here, the related art indicates that a voltage waveform is symmetric as in PTL 1 (PTL 2 will be described later). In FIG. 5, pulses of No. 1 to No. 5 are present within one period, and thus the pulse number Np is 5. When seen at an inter-line voltage $V_{uv}$ ($=V_u−V_v$), five pulse numbers are present within a half period, and ten pulse numbers are present within one period, but the pulse number Np at the U-phase voltage $V_u$ is used in the following description. The switching phase $θ_{sw}$ of FIG. 4 is a fundamental voltage phase $θ_v$ when switching is generated, and is distinguished by $θ_{sw1}$ to $θ_{swn}$ through the attachment of suffixes as in FIG. 5.

The gate signal output means 44 outputs the gate signals Sup, Sun, Svp, Svn, Swp, and Swn on the basis of the switching phase $θ_{sw}$.

The components in Example 1 are as described above. Next, the characteristic means and operation principle of the present invention will be described.

The characteristic means of the present invention is that the switching control means 4 controls the switching element of the inverter 2 so that the waveform diagram of the U-phase voltage $V_u$ is asymmetric. Specifically, the switching phase storage means 43 stores such switching phases $θ_{sw1}$ to $θ_{swn}$.

FIG. 6 shows a voltage waveform diagram of the inverter according to the present invention. The pulse number Np and the number of switching phases $θ_{sw}$ are the same as those in FIG. 5 (inverter according to the related art), and a switching loss of the inverter 2 does not increase by the application of the present invention. The related art and the present invention are different from each other, in that the width of the pulse No. 1 is larger than the width of the No. 2 in FIG. 6 (the same is true of FIG. 5). In addition, both are different from each other, in that the position of the pulse No. 4 shifts from a fundamental voltage phase of 270 deg.

FIG. 7 shows results of comparison between the related art and the present invention. In the related art, there are both half-wave symmetry and odd symmetry in the waveform diagram of the U-phase voltage $V_u$. The half-wave symmetry is the symmetry of a width centering on a fundamental voltage phase of 180 deg±180 deg, and is represented by (Expression 2).

$$V_u(\theta) = -V_u(\theta + \pi) \quad \text{(Expression 2)}$$

In addition, the odd symmetry is the symmetry of a width centering on a fundamental voltage phase of 0 deg±90 deg, and is represented by (Expression 3).

$$V_u(\theta) = V_u(\pi - \theta) \quad \text{(Expression 3)}$$

In the FFT analysis results of FIG. 7, the following (1) to (3) are established as a universal property.

(1) In a case where (Expression 2) is established, an even-ordered harmonic voltage is zero.

(2) In a case where (Expression 3) is established, a harmonic voltage phase is zero or ±180 deg.

(3) in a case where the AC motor 1 and the inverter 2 are in three-phase equilibrium, the 3n-th harmonic voltages of the three-phase alternating-current voltages $V_u$, $V_v$, and $V_w$ cancel out each other as inter-line voltages $V_{uv}$, $V_{vw}$, and $V_{wu}$, and thus virtually are regarded as zero (a voltage which is applied to the coil of the AC motor 1 is an inter-line voltage rather than an inter-phase voltage).

From the properties of (1) to (3), the FFT analysis results of the U-phase voltage $V_u$ in the related art show the presence of only first and (6n±1)-th orders, and all these phases are set to zero (however, only first, fifth and seventh orders are shown in FIG. 7). Thus, for example, the waveform diagrams of a U-phase fundamental voltage $V_{u1}$ and a U-phase fifth harmonic voltage $V_{u5}$ are plotted, both the waveform diagrams pass through the origin.

On the other hand, in the present invention, the waveform diagram of the U-phase voltage $V_u$ has half-wave symmetry, but does not have odd symmetry. In this case, in the FFT analysis results, the even-ordered harmonic voltage is not generated, and a (6n±1)-th harmonic voltage phase $\phi_{6n\pm1}$ shifts from zero. Thus, in a case where the waveform diagrams of the U-phase fundamental voltage $V_{u1}$ and the U-phase fifth harmonic voltage $V_{u5}$ are plotted, the latter shifts from the origin by a fifth harmonic voltage phase $\phi_5$.

In the present invention, since a torque pulsation is reduced due to a shift in the (6n±1)-th harmonic voltage phase $\phi_{6n\pm1}$, the generation principle of a q-axis component of a torque pulsation, that is, a harmonic current will be first described. A U-phase fifth harmonic voltage $V_{u5}$, a V-phase fifth harmonic voltage $V_{v5}$, a W-phase fifth harmonic voltage $V_{w5}$, a U-phase seventh harmonic voltage $V_{u7}$, a V-phase seventh harmonic voltage $V_{v7}$ and a W-phase seventh harmonic voltage $V_{w7}$ are represented by (Expression 4) and (Expression 5) from (Expression 1).

$$\begin{bmatrix} V_{u5} \\ V_{v5} \\ V_{w5} \end{bmatrix} = V_5 \begin{bmatrix} \sin(5(\theta_v + \phi_5)) \\ \sin\left(5\left(\theta_v + \phi_5 - \frac{2\pi}{3}\right)\right) \\ \sin\left(5\left(\theta_v + \phi_5 + \frac{2\pi}{3}\right)\right) \end{bmatrix} = V_5 \begin{bmatrix} \sin(5\theta_v + 5\phi_5) \\ \sin\left(5\theta_v + 5\phi_5 + \frac{2\pi}{3}\right) \\ \sin\left(5\theta_v + 5\phi_5 - \frac{2\pi}{3}\right) \end{bmatrix} \quad \text{(Expression 4)}$$

Here, $V_5$ is a fifth harmonic voltage amplitude.

$$\begin{bmatrix} V_{u7} \\ V_{v7} \\ V_{w7} \end{bmatrix} = V_7 \begin{bmatrix} \sin(7(\theta_v + \phi_7)) \\ \sin\left(7\left(\theta_v + \phi_7 - \frac{2\pi}{3}\right)\right) \\ \sin\left(7\left(\theta_v + \phi_7 + \frac{2\pi}{3}\right)\right) \end{bmatrix} = V_5 \begin{bmatrix} \sin(7\theta_v + 7\phi_7) \\ \sin\left(7\theta_v + 7\phi_7 + \frac{2\pi}{3}\right) \\ \sin\left(7\theta_v + 7\phi_7 - \frac{2\pi}{3}\right) \end{bmatrix} \quad \text{(Expression 5)}$$

Here, $V_7$ is a seventh harmonic voltage amplitude.

FIG. 2 shows vectors of a fifth harmonic voltage $V_{5vec}$ and a seventh harmonic voltage $V_{7vec}$ in accordance with (Expression 4) and (Expression 5). The fifth harmonic voltage $V_{5vec}$ rotates in a clockwise direction by a phase $(5\theta_v + 5\phi_5)$ on the basis of the $-\alpha$-axis. Similarly, the seventh harmonic voltage $V_{7vec}$ rotates in a counterclockwise direction by a phase $(7\theta_v + 7\phi_7)$ on the basis of the $\alpha$-axis. In a case where three-phase to two-phase transformation is performed on (Expression 4) and (Expression 5), a fifth harmonic voltage d-axis component $V_{d5}$ and a fifth harmonic voltage q-axis component $V_{q5}$ are represented by (Expression 6), and a seventh harmonic voltage d-axis component $V_{d7}$ and a seventh harmonic voltage q-axis component $V_{q7}$ are represented by (Expression 7).

$$\begin{bmatrix} V_{d5} \\ V_{q5} \end{bmatrix} = -V_5 \begin{bmatrix} \sin(6\theta_v + 5\phi_5 - \phi) \\ \cos(6\theta_v + 5\phi_5 - \phi) \end{bmatrix} \quad \text{(Expression 6)}$$

$$\begin{bmatrix} V_{d7} \\ V_{q7} \end{bmatrix} = V_7 \begin{bmatrix} -\sin(6\theta_v + 7\phi_7 + \phi) \\ \cos(6\theta_v + 7\phi_7 + \phi) \end{bmatrix} \quad \text{(Expression 7)}$$

According to (Expression 6), the fifth harmonic voltage $V_{5vec}$ of FIG. 2 rotates in a clockwise direction by a phase $(6\theta_v + 5\phi_5 - \phi)$ on the basis of the $-q$-axis. In addition, according to (Expression 7), the seventh harmonic voltage $V_{7vec}$ rotates in a counterclockwise direction by a phase $(6\theta_v + 7\phi_7 + \phi)$ on the basis of the q-axis. In a case where (Expression 6) and (Expression 7) are substituted into (Expression 8) which is a simple harmonic model of the AC motor 1, (Expression 9), (Expression 10), and (Expression 11) are obtained.

$$\begin{bmatrix} V_{dn} \\ V_{qn} \end{bmatrix} = \begin{bmatrix} sL & -\omega L \\ \omega L & sL \end{bmatrix} \begin{bmatrix} I_{dn} \\ I_{qn} \end{bmatrix} \quad \text{(Expression 8)}$$

Here, L is inductance of the AC motor 1, and s is a Laplace operator.

$V_{dn}$ is an n-th harmonic voltage d-axis component, and $V_{qn}$ is an n-th harmonic voltage q-axis component.

$I_{dn}$ is an n-th harmonic current d-axis component, and $I_{qn}$ is an n-th harmonic current q-axis component.

$$\begin{bmatrix} I_{d5} \\ I_{q5} \end{bmatrix} = \frac{V_5}{5\omega L} \begin{bmatrix} \cos(6\theta_v + 5\phi_5 - \phi) \\ -\sin(6\theta_v + 5\phi_5 - \phi) \end{bmatrix} = I_5 \begin{bmatrix} \cos(6\theta_v + 5\phi_5 - \phi) \\ -\sin(6\theta_v + 5\phi_5 - \phi) \end{bmatrix} \quad \text{(Expression 9)}$$

Here, $I_{d5}$ is a fifth harmonic current d-axis component, and $I_{q5}$ is a fifth harmonic current q-axis component.

$$\begin{bmatrix} I_{d7} \\ I_{q7} \end{bmatrix} = \qquad \text{(Expression 10)}$$

$$\frac{V_7}{7\omega L}\begin{bmatrix} \cos(6\theta_v + 7\phi_7 + \phi) \\ \sin(6\theta_v + 7\phi_7 + \phi) \end{bmatrix} = I_7 \begin{bmatrix} \cos(6\theta_v + 7\phi_7 + \phi) \\ \sin(6\theta_v + 7\phi_7 + \phi) \end{bmatrix}$$

Here, $I_{d7}$ is a seventh harmonic current d-axis component, and $I_{q7}$ is a seventh harmonic current q-axis component.

$$I_k = \frac{V_k}{k\omega L} \qquad \text{(Expression 11)}$$

Here, $I_k$ is a k-th harmonic current amplitude.

According to (Expression 9), the vector of a fifth harmonic current $I_{5vec}$ of FIG. 2 rotates in a clockwise direction by a phase $(6\theta_v+5\phi_5-\phi)$ on the basis of the d-axis. In addition, the amplitude thereof is "$I_5=V_5/(5\omega L)$", and the q-axis component therein is $I_{q5}$. In addition, according to (Expression 10), the vector of a seventh harmonic current $I_{7vec}$ rotates in a counterclockwise direction by a phase $(6\theta_v+7\phi_7+\phi)$ on the basis of the d-axis. In addition, the amplitude thereof is "$I_7=V_7/(7\omega L)$", and the q-axis component therein is $I_{q7}$. The sum of the fifth harmonic current q-axis component $I_{q5}$ and the seventh harmonic current q-axis component $I_{q7}$ gives rise to the cause of a torque pulsation.

In order to set to a torque pulsation to zero, in FIG. 2, the fifth harmonic current $I_{5vec}$ and the seventh harmonic current $I_{7vec}$ may symmetrically rotate at the same amplitude about the d-axis (dashed-dotted line). In this case, the q-axis component of a harmonic current is canceled, and its conditions are represented by (Expression 12) and (Expression 13).

$$I_5 = I_7 \therefore \frac{V_5}{5} = \frac{V_7}{7} \qquad \text{(Expression 12)}$$

$$(6\theta_v + 5\phi_5 - \phi) - (6\theta_v + 7\phi_7 + \phi) = \qquad \text{(Expression 13)}$$
$$5\phi_5 - 7\phi_7 - 2\phi = \pm 2n\pi$$

(Expression 12) and (Expression 13) are relational expressions relating to fifth and seventh orders, but these expressions can be expanded to the $(6n\pm 1)$-th order of (Expression 14) and (Expression 15) by the same derivation procedure.

$$\frac{V_{6n-1}}{6n-1} = \frac{V_{6n+1}}{6n+1} \qquad \text{(Expression 14)}$$

$$(6n-1)\phi_{6n-1} - (6n+1)\phi_{6n+1} - 2\phi = \pm 2k\pi \qquad \text{(Expression 15)}$$

Here, k is an integer.

In the related art of FIG. 7, in a case where the fifth harmonic voltage amplitude $V_5$ and the seventh harmonic voltage amplitude $V_7$ are adjusted, that is, in a case where the switching phases $\theta_{sw1}$ to $\theta_3$ of FIG. 5 are adjusted, (Expression 14) is satisfied. On the other hand, (Expression 15) is not necessarily established. In the related art of FIG. 7, this is because the fifth harmonic voltage phase $\phi_5$ and the seventh harmonic voltage phase $\phi_7$ are fixed to zero or $\pm 180$ deg, and the fundamental voltage-rotor phase difference $\phi$ becomes variable depending on the operation conditions of the AC motor 1. The establishment of (Expression 15) is limited to a case where the fundamental voltage-rotor phase difference $\phi$ is set to at least the integral multiple of 180 deg.

In the present invention of FIG. 7, (Expression 14) is satisfied as is the case with the related art. In addition, in the present invention of FIG. 7, the fifth harmonic voltage phase $\phi_5$ and the seventh harmonic voltage phase $\phi_7$ are not fixed to zero or $\pm 180$ deg, and become variable depending on the switching phases $\theta_{sw1}$ to $\theta_{swn}$. Consequently, in a case where the switching phases $\theta_{sw1}$ to $\theta_{swn}$ are adjusted on the basis of the fundamental voltage phase $\phi$, (Expression 15) is satisfied. In this case, the fifth harmonic current q-axis component $I_{q5}$ and the seventh harmonic current q-axis component $I_{q7}$ of FIG. 2 cancel out each other, and a torque pulsation is set to zero. This is the operation principle of the present invention. To sum it up, the following conditions are required.

(1) The voltage waveform of the inverter 2 has half-wave symmetry in the interval of a width centering on a fundamental voltage phase of 180 deg$\pm$180 deg (FIG. 7). A description has been given on the basis of the voltage waveform of the U-phase voltage $V_u$, but the same is true of other phases, the inter-line voltage $V_{uv}$ or the like.

(2) The voltage waveform of the inverter 2 does not have odd symmetry in the interval of a width centering on a fundamental voltage phase of 0 deg$\pm$90 deg (FIG. 7).

(3) The harmonic voltage phase of the inverter 2 becomes variable on the basis of the fundamental voltage-rotor phase difference $\phi$ which is a difference between the fundamental voltage phase and the rotor phase of the AC motor 1. Ideally, the $(6n\pm 1)$-th harmonic voltage phase $\phi_{6n\pm 1}$ satisfies (Expression 15).

(4) The harmonic voltage amplitude of each order of the inverter 2 is inversely proportional to the order. Ideally, a $(6n\pm 1)$-th harmonic voltage amplitude $V_{6n\pm 1}$ satisfies (Expression 14).

Comparison with PTL 2 will be supplemented. In FIG. 7, PTL 2 is based on the condition that there is no half-wave symmetry. For this reason, the design degree of freedom of the switching phases $\theta_{sw1}$ to $\theta_{swn}$ in FIG. 6 is considered to be high. However, in a case where the half-wave symmetry is lost, there is a problem in that an even-ordered harmonic voltage $V_{2n}$ is generated. In the present invention, the half-wave symmetry is held, and only the odd symmetry is not held, whereby the problem is solved.

(Expression 15) will be supplemented. In (Expression 15), only when the fundamental voltage-rotor phase difference $\phi$ is zero, the harmonic voltage phase $\phi_{6n\pm 1}$ may be zero. That is, the voltage waveform of the inverter 2 may have odd symmetry in the interval of a width centering on a fundamental voltage phase of 0 deg$\pm$90 deg. Naturally, the combination of the harmonic voltage phase $\phi_{6n\pm 1}$ satisfying (Expression 15) is innumerable, and thus the odd symmetry is not essential. However, since (Expression 15) is automatically satisfied by making an allowance for the odd symmetry to be given, it is possible to omit the design of the switching phases $\theta_{sw1}$ to $\theta_{swn}$.

The application of (Expression 14) and (Expression 15) will be described. It is complicated to design the switching phases $\theta_{sw1}$ to $\theta_{swn}$ so as to satisfy both (Expression 14) and (Expression 15). Consequently, these expressions are combined into one. (Expression 16) and (Expression 17) are established from (Expression 9) and (Expression 10).

$$I_{q5}+I_{q7}=I_{q6} \sin(6\theta_v+\theta_0) \qquad \text{(Expression 16)}$$

$$I_{q6}=\sqrt{I_7^2+I_5^2-2I_5I_7\cos(7\phi_7-5\phi_5+2\phi)} \qquad \text{(Expression 17)}$$

Here, $I_{q6}$ is a sixth harmonic current q-axis component.

(Expression 16) and (Expression 17) mean that, in FIG. 2, the sum of the fifth harmonic current q-axis component $I_{q5}$ and the seventh harmonic current q-axis component $I_{q7}$ gives rise to a pulsation at amplitude $I_{q6}$ and frequency $6\theta_v$ on the q-axis. In a case where the sixth harmonic current q-axis component $I_{q6}$ of (Expression 17) is zero, the pulsation thereof is not present, and a torque pulsation is not also generated. Thus, in a case where the switching phases $\theta_{sw1}$ to $\theta_{swn}$ are optimized so as to reduce (Expression 17), the torque pulsation is reduced. Ideally, (Expression 17) is set to zero, and this is coincident with a case where both (Expression 14) and (Expression 15) are established. Thereby, it can be understood that the switching phases $\theta_{sw1}$ to $\theta_{swn}$ may be optimized so as to reduce (Expression 17), instead of satisfying both (Expression 14) and (Expression 15). In (Expression 17), only a (6n±1)-th order can be considered. Therefore, in a case of expansion to a generic dimension, (Expression 18) is obtained.

$$\sum_{n=1}^{N} I_{q6n}^2 = \sum_{n=1}^{N} \{I_{6n+1}^2 + I_{6n-1}^2 - 2I_{6n-1}I_{6n+1} \\ \cos((6n+1)\phi_{6n+1} - (6n-1)\phi_{6n-1} + 2\phi)\}$$ (Expression 18)

Here, $I_{q6n}$ is a 6n-th harmonic current q-axis component.

Considering (Expression 11), the reduction of (Expression 18) is equivalent to the reduction of a parameter Q in (Expression 19).

$$Q = \sum_{n=1}^{N} \left\{ \left(\frac{V_{6n+1}}{6n+1}\right)^2 + \left(\frac{V_{6n-1}}{6n-1}\right)^2 - 2\frac{V_{6n-1}V_{6n+1}}{(6n-1)(6n+1)} \\ \cos((6n+1)\phi_{6n+1} - (6n-1)\phi_{6n-1} + 2\phi) \right\}$$ (Expression 19)

To sum it up, in a case where the switching phases $\theta_{sw1}$ to $\theta_{swn}$ are optimized so as to reduce the parameter Q of (Expression 19), the torque pulsation is reduced. Ideally, the parameter Q of (Expression 19) is zero, and the torque pulsation is set to zero in this case.

FIG. 8 shows results of comparison between the related art and the present invention in a case where a reduction in the parameter Q is used. In the related art, the (6n±1)-th harmonic voltage phase $\phi_{6n±1}$ is set to zero or ±180 deg as shown by arrows P2 and P3. On the other hand, in the present invention, the (6n±1)-th harmonic voltage phase $\phi_{6n±1}$ is not limited to zero or ±180 deg as shown by arrows P4 and P5, and is optimized so as to minimize the 6n-th harmonic current q-axis component $I_{q6n}$ as shown by arrows P6 and P7 (only sixth and twelfth orders are shown in FIG. 8). However, a 6n-th harmonic current d-axis component $I_{d6n}$ increases as shown by arrow P8. As a result, (6n±1)-th harmonic current $I_{6n±1}$ may increase as shown by arrow P1. This results from the intensive reduction of a q-axis component within a harmonic current.

The application of (Expression 19) will be described. A parameter D proportional to the square value of the 6n-th harmonic current d-axis component $I_{d6n}$ can be derived as in (Expression 20), in the same procedure as that of the derivation of (Expression 19).

$$D = \sum_{n=1}^{N} \left\{ \left(\frac{V_{6n+1}}{6n+1}\right)^2 + \left(\frac{V_{6n-1}}{6n-1}\right)^2 + 2\frac{V_{6n-1}V_{6n+1}}{(6n-1)(6n+1)} \\ \cos((6n+1)\phi_{6n+1} - (6n-1)\phi_{6n-1} + 2\phi) \right\}$$ (Expression 20)

In a case where the switching phases $\theta_{sw1}$ to $\theta_{swn}$ are optimized so as to reduce (Expression 20), the electromagnetic exciting force of the AC motor 1 can be reduced. The electromagnetic exciting force herein is a fluctuation in magnetic suction force acting in the radial direction of the AC motor 1, and is a component orthogonal to a torque pulsation. Depending on the mechanical structure of the AC motor 1, the intensive reduction of the electromagnetic exciting force rather than the torque pulsation leads to the capability of reducing vibration and noise in some cases. In this case, it is preferable to optimize the switching phases $\theta_{sw1}$ to $\theta_{swn}$ so as to reduce (Expression 20).

Hereinbefore, in the present invention, even-ordered harmonic voltages and currents are not generated, and a harmonic current component contributing to a torque pulsation can be intensively reduced rather than the orthogonal component. In addition, the effect is held regardless of the operation conditions of an AC motor. Further, as its application, it is also intensively reduce the orthogonal component described earlier, that is, the harmonic current component contributing to the electromagnetic exciting force.

EXAMPLE 2

FIG. 9 is a configuration diagram of Example 2. However, the same points as those in Example 1 will be omitted. In Example 2, the AC motor 1 is a drive source of a wheel 5 included in an electromotive vehicle drive system 6.

The torque pulsation of the AC motor 1 gives rise to the cause of vibration and noise of the wheel 5 and the electromotive vehicle drive system 6. According to the present invention, it is possible to reduce the torque pulsation of the AC motor 1 without increasing the switching frequency of the inverter 2. Consequently, it is possible to reduce vibration and noise of the wheel 5 and the electromotive vehicle drive system 6 without increasing the size of the cooling equipment of the inverter 2.

The present invention is particularly effective during the launching of the electromotive vehicle drive system 6, that is, during the high torque and low-speed rotation of the AC motor 1. On the other hand, merits of reducing a torque pulsation are small during the high-speed operation of the electromotive vehicle drive system 6, that is, during the low torque and high-speed rotation of the AC motor 1. This is because, during the high-speed operation (steady operation) of the electromotive vehicle drive system 6, a reduction in the effective value of a harmonic current, that is, an improvement of the efficiency of the AC motor 1 is demanded rather than a reduction in a torque pulsation.

Consequently, the switching control means 4 switches the presence or absence of odd symmetry of a voltage waveform in accordance with the operation conditions of the electromotive vehicle drive system 6. For example, during the launching of the electromotive vehicle drive system 6, a loss of the odd symmetry of a voltage waveform is caused, and a torque pulsation is reduced (the present invention of FIG. 8). On the other hand, during the high-speed operation of the electromotive vehicle drive system 6, the odd symmetry of the voltage waveform is held, and a reduction in the effective value of a harmonic current is achieved (the related art of FIG. 8).

As described above, it is possible to cope with the needs (reduction in vibration and noise or improvement in efficiency) according to the operation conditions of the electromotive vehicle drive system 6.

EXAMPLE 3

FIG. 10 is a configuration diagram of Example 3. However, the same points as those in Example 1 will be omitted.

In Example 3, a compressor device 71 of a refrigeration air conditioner 7 is driven using the AC motor 1.

The refrigeration air conditioner 7 includes a compressor device 71, a pipeline 72, an outdoor instrument 73, an expansion valve 74, and an indoor instrument 75. Each of the operations thereof is as follows.

The compressor 71 compresses a refrigerant flowing through a pipeline 62. The pipeline 72 circulates the refrigerant. The outdoor instrument 73 emits heat of the refrigerant to the outside, and liquefies the refrigerant. The expansion valve 74 expands the refrigerant, and drops the temperature of the refrigerant. The indoor instrument 75 absorbs heat from the outside using the cooled refrigerant.

The refrigeration air conditioner 7 serves an air-cooling function through the above-mentioned cycle. In addition, the refrigeration air conditioner serves an air-heating function by reversely carrying out the cycle. The compressor device 71 is a device essential for the refrigeration air conditioner 7, and it is preferable that this is driven with low vibration and low noise.

The compressor device 71 is configured such that a load torque pulsates in synchronization with a compression process. Consequently, the load torque includes not only a fundamental, but also a harmonic. In this case, it is preferable that the motor torque of the AC motor 1 is entirely coincident with the load torque for each order component. This is because the motor torque and the load torque cancel out each other for each order, and the rotational speed of the compressor device 71 becomes constant. However, in the related art, since the phases of a fundamental voltage and a harmonic voltage are fixed, the fundamental and harmonic of the motor torque are not able to be adjusted independently. For this reason, the rotational speed of the compressor device 71 fluctuates, which leads to not only the generation of vibration and noise, but also a deterioration in the air-conditioning performance of the refrigeration air conditioner 7.

According to the present invention, the phases of a fundamental voltage and a harmonic voltage are not fixed, and can be adjusted in accordance with the load torque. Therefore, the compressor device 71 is stably driven at a constant rotational speed.

REFERENCE SIGNS LIST

1: AC motor, 2: inverter, 3: phase detection means, 4: switching control means, 41: fundamental voltage calculation means, 42: division means, 43: switching phase storage means, 44: gate signal output means, 5: wheel, 6: electromotive drive vehicle system, 7: refrigeration air conditioner, 71: compressor device, 72: pipeline, 73: outdoor instrument, 74: expansion valve, 75: indoor instrument, VDC: direct-current voltage, $V_u$, $V_v$, $V_w$: U-phase voltage, V-phase voltage, W-phase voltage, $V_1$: fundamental voltage amplitude, $I_u$, $I_v$, $I_w$: U-phase current, V-phase current, W-phase current, $\theta_v$: fundamental voltage phase, $\theta_q$: rotor phase position, $\phi$: fundamental voltage-rotor phase difference, $\omega$: rotational speed.

The invention claimed is:

1. A control device of an AC motor, comprising:
an inverter including a switching element;
switching control means for controlling the switching element; and
phase detection means for detecting a rotor phase of an AC motor,
wherein the switching control means controls the switching element so that a voltage waveform of the inverter has half-wave symmetry in an interval of a width centering on a fundamental voltage phase of 180 deg±180 deg,
the switching control means controls the switching element so that a harmonic voltage phase of the inverter becomes variable on the basis of a fundamental voltage-rotor phase difference which is a difference between a fundamental voltage phase and the rotor phase of the AC motor,
the switching control means controls the switching element so that a harmonic voltage amplitude of each order of the inverter is inversely proportional to the order, and
the switching control means controls the switching element so that a (6n−1)-th harmonic voltage phase $\phi_{(6n-1)}$ and a (6n+1)-th harmonic voltage phase $\phi_{(6n+1)}$ of the inverter and the fundamental voltage-rotor phase difference $\phi$ satisfy (Expression 15), wherein $$(6n-1)\phi_{6n-1} - (6n+1)\phi_{6n+1} - 2\phi = \pm 2k\pi \quad \text{(Expression 15)}.$$

2. The control device of an AC motor according to claim 1, wherein the switching control means controls the switching element so that a (6n−1)-th harmonic voltage amplitude $V_{6n-1}$ and a (6n+1)-th harmonic voltage amplitude $(\phi)_{6n+1}$ of the inverter satisfy (Expression 14), wherein $$\frac{V_{6n-1}}{6n-1} = \frac{V_{6n+1}}{6n+1}. \quad \text{(Expression 14)}$$

3. The control device of an AC motor according to claim 1, wherein the switching control means controls the switching element so as to reduce a parameter Q of (Expression 19) with respect to any integer N, wherein $$Q = \sum_{n=1}^{N} \left\{ \left(\frac{V_{6n+1}}{6n+1}\right)^2 + \left(\frac{V_{6n-1}}{6n-1}\right)^2 - 2\frac{V_{6n-1}V_{6n+1}}{(6n-1)(6n+1)} \right. $$
$$\left. \cos((6n+1)\phi_{6n+1} - (6n-1)\phi_{6n-1} + 2\phi) \right\}. \quad \text{(Expression 19)}$$

4. The control device of an AC motor according to claim 1, wherein the switching control means controls the switching element so as to reduce a parameter D of (Expression 20) with respect to any integer N, wherein $$D = \sum_{n=1}^{N} \left\{ \left(\frac{V_{6n+1}}{6n+1}\right)^2 + \left(\frac{V_{6n-1}}{6n-1}\right)^2 + 2\frac{V_{6n-1}V_{6n+1}}{(6n-1)(6n+1)} \right.$$
$$\left. \cos((6n+1)\phi_{6n+1} - (6n-1)\phi_{6n-1} + 2\phi) \right\}. \quad \text{(Expression 20)}$$

5. The control device of an AC motor according to claim 1, wherein the AC motor is a drive source of a compressor, and
the switching control means controls the switching element on the basis of a frequency component of a load torque of a compressor.

6. A control device of an AC motor, comprising:
an inverter including a switching element;
switching control means for controlling the switching element; and phase detection means for detecting a rotor phase of an AC motor, wherein the switching control means controls the switching element so that a voltage waveform of the inverter has half-wave symmetry in an interval of a width centering on a fundamental voltage phase of 180 deg±180 deg, the switching control means controls the switching element so that a harmonic voltage phase of the inverter becomes variable on the basis of a fundamental voltage-rotor phase difference which is a difference between a fundamental voltage phase and the rotor phase of the AC motor, the switching control means controls the switching element so that a harmonic voltage amplitude of each order of the inverter is inversely proportional to the order, and the switching control means controls the switching element so that only when the fundamental voltage-rotor phase difference is zero, the voltage waveform of the inverter has odd symmetry in an interval of a width centering on a fundamental voltage phase of 0 deg±90 deg.

7. A control device of an AC motor, comprising:

an inverter including a switching element;

switching control means for controlling the switching element; and phase detection means for detecting a rotor phase of an AC motor, wherein the switching control means controls the switching element so that a voltage waveform of the inverter has half-wave symmetry in an interval of a width centering on a fundamental voltage phase of 180 deg±180 deg, the switching control means controls the switching element so that a harmonic voltage phase of the inverter becomes variable on the basis of a fundamental voltage-rotor phase difference which is a difference between a fundamental voltage phase and the rotor phase of the AC motor, the switching control means controls the switching element so that a harmonic voltage amplitude of each order of the inverter is inversely proportional to the order, the AC motor is a drive source of an electromotive vehicle drive system, and the switching control means controls the switching element so that the presence or absence of odd symmetry in an interval of a width centering on a fundamental voltage phase of 0 deg±90 deg is switched on the basis of operation conditions of the electromotive vehicle drive system.

* * * * *